INVENTOR.
ADOLPH V. MITTERER

United States Patent Office 3,777,003
Patented Dec. 4, 1973

3,777,003
CONTINUOUS VAT LEACHING PROCESS
Adolph V. Mitterer, Lakewood, Colo., assignor to Continental Oil Company, Ponca City, Okla.
Filed Sept. 1, 1970, Ser. No. 68,690
Int. Cl. B01d *11/00;* C01g *43/00*
U.S. Cl. 423—20   6 Claims

ABSTRACT OF THE DISCLOSURE

The present invention relates to a method for leaching a mineral from an ore containing said mineral wherein a leaching solution is passed upwardly through a downwardly flowing bed or ore. The leaching solution is passed through the ore under conditions of quiescent flow whereby the mineral is dissolved from the mineral ore and is withdrawn from the upper portion of a vessel containing said bed or ore. The spent ore is withdrawn from the bottom of said vessel and passed to a second vessel wherein the ore is washed free from any entrained leaching solution.

BACKGROUND OF THE INVENTION

Field of the invention

The present invention relates generally to a continuous vat leaching process wherein a leaching solution is passed through a bed of ore to remove the mineral content from said ore.

Description of the prior art

Most commercial uranium ores contain only a few pounds of uranium in each ton. Most conventional benefication processes involve leaching the uranium minerals with suitable solvents, then separating the uranium bearing solvent from barren gangue, and finally precipitating the dissolved mineral from its solvent.

These separation processes all employ agitation, pumping, settling, and always in a relatively dilute fluid medium. Only minute quantities of solvent are utilized in actual leaching of the mineral. Most of the reagent is required to maintain sufficient reagent concentration in the abundant fluid medium to drive the leaching reactions forward. Additional dilution is imparted to the process in the course of decanting, settling and separating the uranium-bearing solvent from barren gangue. The inevitable result is substantial loss of reagent, mostly by dilution.

These conventional processes use great quantities of fluid, water and reagents in a large and costly plant. The resulting mineral-bearing solvent is very dilute and therefore difficult and costly to treat.

SUMMARY OF THE INVENTION

The present invention relates to a method of continuously leaching a bed of mineral ore to remove the mineral content from the ore. In this invention the mineral ore is passed downwardly into a vessel while continuously passing a leaching solution upwardly through said bed of ore. The leaching solution passes through the bed of ore under quiescent flow conditions, thereby dissolving the mineral from said ore and is passed out of said vessel as a solution containing the mineral which has been removed from the ore. The spent ore is withdrawn from the bottom of said vessel and passed to a second vessel wherein the ore and any entrained leaching solution is washed countercurrently with a sweep solution to remove the leaching solution from the spent ore.

With the prior art teaching of agitation in a dilute fluid medium it was unexpected that by utilizing quiescent flow a high concentration of mineral could be extracted from the ore without a large carryover of suspended solids and without utilizing a large quantity of solvent.

It is an object of this invention to accomplish the leaching of uranium ore under quiescent rather than turbulent conditions thus minimizing the quantities of solvent required and resulting in high mineral concentration in the leach solution with minimum carryover of suspended solids.

Other and further objects will become apparent from the following detailed description of the invention.

DESCRIPTION OF THE PREFERRED EMBODIMENTS

Detailed description

Figure 1:
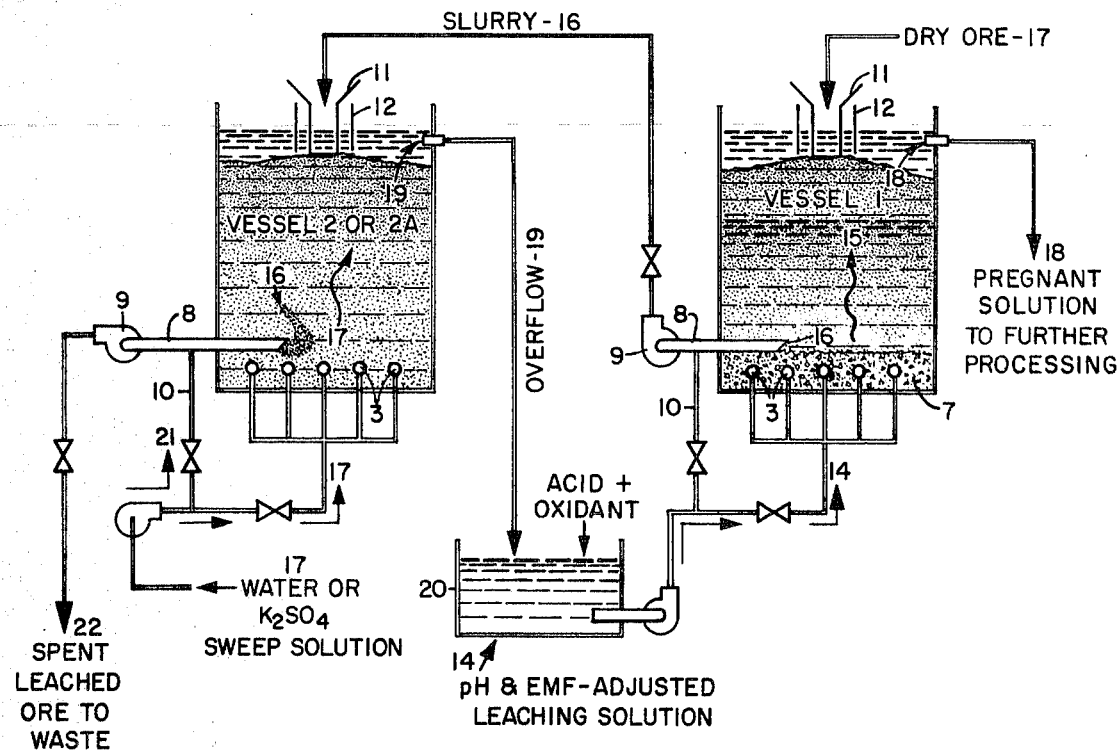
FIG. 1 is a simplified flow diagram of the preferred embodiment of the invention.
Figure 2:
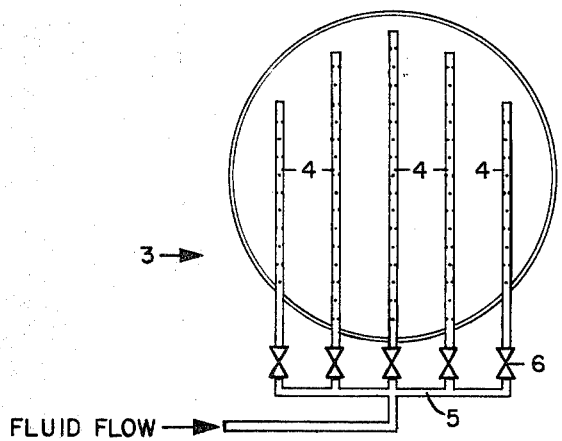
FIG. 2 is a view showing the manifold arrangement for introducing the leaching solution into the bottom of the vessel containing the mineral ore.

Broadly described, this invention accomplishes the leaching of uranium ore under quiescent rather than turbulent conditions, thus minimizing the quantities of solvent required and resulting in high mineral concentration in the leach liquor or solvent with minimum carryover of suspended solids. The process embodies a sweep-front leaching principle with continuous treatment of the ore.

One embodiment of the concept employs two or more vertical cylindrical vessels 1, 2 and 2a. A pipe manifold 3 is displaced in the bottom of each vessel. Each manifold comprises a number of interconnected horizontal pipes 4, each perforated throughout its length so as to feed the solvent in an even blanket across the bottom of the tank. The pipes may be connected to the manifold directly, or through valves 6 if necessary to control and direct the flow. The manifold may be open or covered with a bed of gravel 7 or other inert granular material, or with a screen or perforated bubble plate if necessary to assure even upward flow.

Above the manifold is a larger-diameter horizontal discharge pipe 8 to be used for removing solids from the vessel. This discharge pipe may be single or branched and may extend horizontally to whatever point or points will discharge a vessel most effectively. It is connected through suitable valving to a solids handling pump 9, to a screw conveyer, to a jet pump, air lift, syphon or other enclosed device for transferring the spent ore from one vessel to another. Piping 10 is provided to dilute the spent ore for handling or to assist in starting the flow of said spent ore from the first vessel.

A vertical charging standpipe 11 is provided for charging the ore to the vessel. A stilling well 12 is also provided at the top of each vessel for providing a space above the body of ore for withdrawing the leach solution containing dissolved mineral from said vessel.

In operation, vessel 1 is filled with crushed and screened ore 13 to the bottom of the standpipe 11. Solvent 14 is pumped into the vessel through the manifold 3 at a slow rate so that the fluid rises through the ore column under quiescent flow. As the fluid progresses upward, mineral is dissolved and carried upward by the solution front 15. As the solution front progresses upward in the column, depleted ore 16 is drawn off through the discharge pipe 8 and transferred 9 to the standpoint 11 of vessel 2, where it settles beneath the fluid surface.

As the solids are drawn off at the bottom new dry ore 17 flows in through the standpipe in vessel 1 and spreads across the vessel beneath the fluid surface. Clear mineral-laden pregnant solution 18 overflows the top of the vessel and is pumped to further processing to precipitate and recover the uranium using any suitable process.

In the second vessel 2 the depleted ore 16 spreads across the tank beneath the fluid surface. Water or appropriate sweep solution 17 is displaced in the bottom of the tank through a manifold system 3, 4, 5, 6 as explained above. As the sweep solution moves forward in the tank it displaces entrained solvent from the spent ore and overflows 19 to the solvent reservoir 20 along with the solvent used to slurry and transfer the spent ore from vessel 1 to vessel 2.

Additional water 21 may be added to the discharge piping 8 and solids handling pump 9 of vessel 2 to facilitate discharge of leached ore to waste 22.

Water and sweep solution displaced into vessel 2 comprise all water makeup for the process. Solvent for leaching is made up in the solvent reservoir 20 from sweep solution and recycled solvent overflow from tank 2, with the addition of appropriate acids, or other solvents, plus oxidants or other additives to control or drive the chemical leaching action in vessel 1. It is contemplated that addition of reagents to the solvent reservoir may be controlled automatically to maintain appropriate pH, oxidation potential or other solvent characteristics.

These concepts of this invention are adaptable equally as well to leaching of other minerals, vegetable or chemical products with appropriate solvents. One such application is the production of phosphoric acid by leaching ground phosphate rock with sulfuric acid.

Those skilled in the art will recognize that a multiplicity of vessels can be utilized to accomplish the leaching in several steps, or to selectively leach different minerals in separate stages. They will also recognize that a further possible embodiment of the concept will be to accomplish the leaching within a single tank by displacing an auxiliary manifold midway in the tank through which solvents could be added to the rising column of sweep fluid from the tank bottom. It is also contemplated that gaseous materials may be added to the vessels either to aid in oxidation reactions or to provide mild agitation to the bed.

What is considered new and inventive in the present invention is defined in the hereunto appended claims, it being understood, of course, that equivalents known to those skilled in the art are to construed as within the scope and purview of the claims.

What is claimed is:

1. In a process for leaching a mineral from an ore containing said mineral when a leaching solution is passed through a bed of ore and the mineral is removed from said bed as a component of said leaching solution, the improvement of sweep-front leaching using a minimum quantity of solvent to produce a high mineral concentration leach liquor comprising:
    (a) passing a leaching solution having quiescent flow upwardly through a downwardly moving bed of ore in a vessel; and
    (b) withdrawing said leaching solution, containing dissolved minerals therein, from the upper portion of said vessel immediately above said bed of ore.

2. In a process for leaching a mineral from an ore containing said mineral wherein a leaching solution is passed through a bed of ore and the mineral is removed from said bed as a component of said leaching solution, the improvement of sweep-front leaching using a minimum quantity of solvent to produce a high mineral concentration leach liquor comprising:
    (a) passing a leaching solution having quiescent flow upwardly through a downwardly moving bed of ore in a first vessel;
    (b) withdrawing said leaching solution, containing dissolved minerals therein, from the upper portion of said vessel immediately above said bed of ore;
    (c) withdrawing a slurry of spent ore and leaching solution from the bottom of said bed;
    (d) passing said slurry from step (c) into a second vessel downwardly through an upwardly flowing sweep solution having quiescent flow to separate the spent ore from said leaching solution;
    (e) removing a slurry of spent ore and sweep solution from a lower portion of said second vessel;
    (f) removing said separated leaching solution of step (d) from the upper portion of said second vessel;
    (g) combining the separated leaching solution of step (f) with fresh leaching solution to form the leaching solution of step (a);
    (h) repeating steps (a) to (h).

3. The process of claim 2 wherein said mineral is uranium, the leaching solution is sulfuric acid and the sweep solution is selected from the group consisting of water and $K_2SO_4$.

4. The process of claim 2 wherein the slurry of step (c) is introduced serially into a plurality of leaching vessels wherein steps (a) to (c) are repeated prior to proceeding with step (d).

5. The process of claim 2 wherein said mineral is phosphorus, the mineral ore is phosphate rock, the leaching solution is sulfuric acid, and the sweep solution is selected from the group consisting of water and $K_2SO_4$.

6. The process of claim 2 wherein said leaching solution enters the lower portion of said bed of ore through a manifold of interconnected horizontal pipes having perforations in said horizontal pipes.

References Cited
UNITED STATES PATENTS

| | | | |
|---|---|---|---|
| 1,827,971 | 10/1931 | Croasdale | 75—121 X |
| 2,904,518 | 9/1959 | Shea | 23—270 X |
| 3,390,402 | 6/1968 | Goerg | 23—270 |
| 3,200,067 | 8/1965 | Levendusky | 23—270 X |
| 1,964,382 | 6/1934 | Fleischer | 23—270 |
| 3,468,633 | 9/1969 | Honchar | 23—310 X |
| 2,885,270 | 5/1959 | Karcher et al. | 23—312 X |
| 3,288,569 | 8/1963 | Henrickson et al. | 23—319 |
| 3,175,878 | 3/1965 | Hillyer | 23—320 |
| 3,445,382 | 5/1969 | Wale | 23—270 X |
| 2,882,123 | 4/1959 | Long | 23—341 X |

CARL D. QUARFORTH, Primary Examiner

R. L. TATE, Assistant Examiner

U.S. Cl. X.R.

23—270 R, 310, 312 ME; 75—1, 101 R